United States Patent
Pilutti et al.

(10) Patent No.: US 9,963,127 B2
(45) Date of Patent: May 8, 2018

(54) COLLISION MITIGATION SYSTEM AND METHOD FOR BRAKING A VEHICLE

(75) Inventors: Thomas Edward Pilutti, Ann Arbor, MI (US); Roger Arnold Trombley, Ann Arbor, MI (US); Anthony Gerald King, Ann Arbor, MI (US); Andreas Eidehall, Molndal (SE)

(73) Assignee: Volvo Car Corporation, Gothenburg (SE)

( * ) Notice: Subject to any disclaimer, the term of this patent is extended or adjusted under 35 U.S.C. 154(b) by 328 days.

(21) Appl. No.: 12/687,919

(22) Filed: Jan. 15, 2010

(65) Prior Publication Data

US 2011/0178710 A1    Jul. 21, 2011

(51) Int. Cl.

| | |
|---|---|
| *B60T 7/22* | (2006.01) |
| *B60W 30/095* | (2012.01) |
| *B60W 30/09* | (2012.01) |
| *B60K 31/00* | (2006.01) |
| *B60W 30/08* | (2012.01) |
| *G08G 1/16* | (2006.01) |

(52) U.S. Cl.
CPC ............ *B60T 7/22* (2013.01); *B60K 31/0008* (2013.01); *B60W 30/08* (2013.01); *B60W 30/09* (2013.01); *B60W 30/095* (2013.01); *B60W 30/0956* (2013.01); *G08G 1/165* (2013.01); *G08G 1/166* (2013.01); *G08G 1/167* (2013.01)

(58) Field of Classification Search
CPC .......... B60T 7/22; G08G 1/165; G08G 1/167; G60W 30/08; B60W 30/09; B60W 30/095; B60W 30/0956; B60K 31/0008
See application file for complete search history.

(56) References Cited

U.S. PATENT DOCUMENTS

| | | | |
|---|---|---|---|
| 6,021,375 A * | 2/2000 | Urai et al. .................... 701/301 |
| 6,026,347 A | 2/2000 | Schuster |
| 6,134,497 A * | 10/2000 | Hayashi et al. ................ 701/70 |
| 6,388,565 B1 | 5/2002 | Bernhard et al. |
| 6,624,747 B1 * | 9/2003 | Friederich et al. ........... 340/436 |
| 6,882,287 B2 | 4/2005 | Schofield |
| 6,889,786 B2 * | 5/2005 | Watanabe ................. B60T 7/22 |
| | | | 180/167 |

(Continued)

FOREIGN PATENT DOCUMENTS

JP    2009096349    *    5/2009   ............ B60R 21/00

OTHER PUBLICATIONS

Jansson, J. Collision Avoidance Theory. Linkoping Studies in Science and Technology. Licentiate Thesis No. 950, Linkopin University, Linkoping, Sweeden, 2005.

(Continued)

*Primary Examiner* — Thomas G Black
*Assistant Examiner* — Sze-Hon Kong
(74) *Attorney, Agent, or Firm* — Brooks Kushman P.C.

(57) ABSTRACT

A collision mitigation system for a vehicle may include a forward sensing system and at least one controller in communication with the forward sensing system. The forward sensing system may be configured to detect objects in front of the vehicle. The at least one controller may be configured to determine whether the vehicle can be steered into a path along side of the vehicle to avoid a collision with detected objects in front of the vehicle and to issue a command to brake the vehicle if the vehicle cannot be steered into the path along side of the vehicle.

6 Claims, 7 Drawing Sheets

(56) References Cited

U.S. PATENT DOCUMENTS

| | | | |
|---|---|---|---|
| 6,926,374 B2 * | 8/2005 | Dudeck et al. | 303/191 |
| 6,940,448 B2 * | 9/2005 | Knoop et al. | 342/70 |
| 6,961,661 B2 | 11/2005 | Sekiguchi | |
| 6,970,787 B2 | 11/2005 | Matsumoto et al. | |
| 7,016,783 B2 * | 3/2006 | Hac et al. | 701/301 |
| 7,034,668 B2 * | 4/2006 | Engelman et al. | 340/435 |
| 7,099,764 B2 * | 8/2006 | Seto et al. | 701/70 |
| 7,355,524 B2 | 4/2008 | Schofield | |
| 8,150,583 B2 * | 4/2012 | Danner et al. | 701/45 |
| 2002/0156581 A1 * | 10/2002 | Matsuura | B62D 7/159 701/301 |
| 2003/0106732 A1 * | 6/2003 | Watanabe | B60T 7/22 180/169 |
| 2003/0201878 A1 * | 10/2003 | Bai | G01S 13/931 340/435 |
| 2004/0155811 A1 * | 8/2004 | Albero | B60K 31/0008 342/70 |
| 2004/0193374 A1 * | 9/2004 | Hac | B60K 31/0008 701/301 |
| 2005/0090955 A1 | 4/2005 | Engelman et al. | |
| 2005/0197771 A1 | 9/2005 | Seick et al. | |
| 2006/0085131 A1 | 4/2006 | Yopp et al. | |
| 2006/0219458 A1 | 10/2006 | Yamashita | |
| 2007/0063874 A1 * | 3/2007 | Danz et al. | 340/932.2 |
| 2008/0046145 A1 * | 2/2008 | Weaver et al. | 701/41 |
| 2008/0065328 A1 | 3/2008 | Eidehall et al. | |
| 2009/0228174 A1 * | 9/2009 | Takagi | B60T 8/17558 701/41 |
| 2009/0326820 A1 * | 12/2009 | Shimizu | B60T 7/22 701/301 |

OTHER PUBLICATIONS

Coelingh, E., et al. Collision Warning With Auto Brake, Fisita, F2006V130, Yokohama Japan Oct. 22-27, 2006.

* cited by examiner

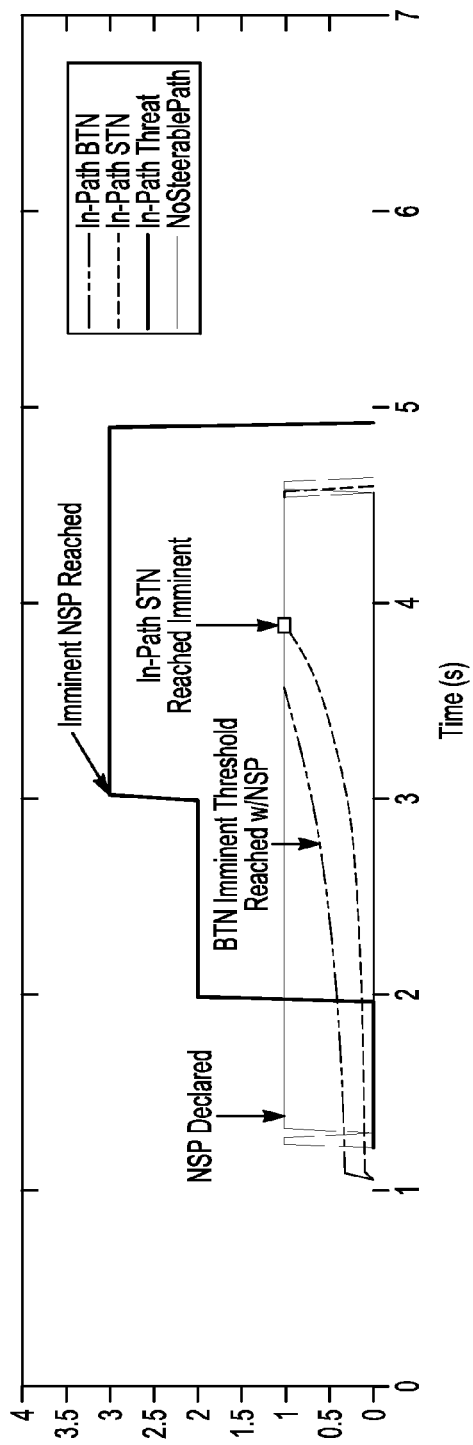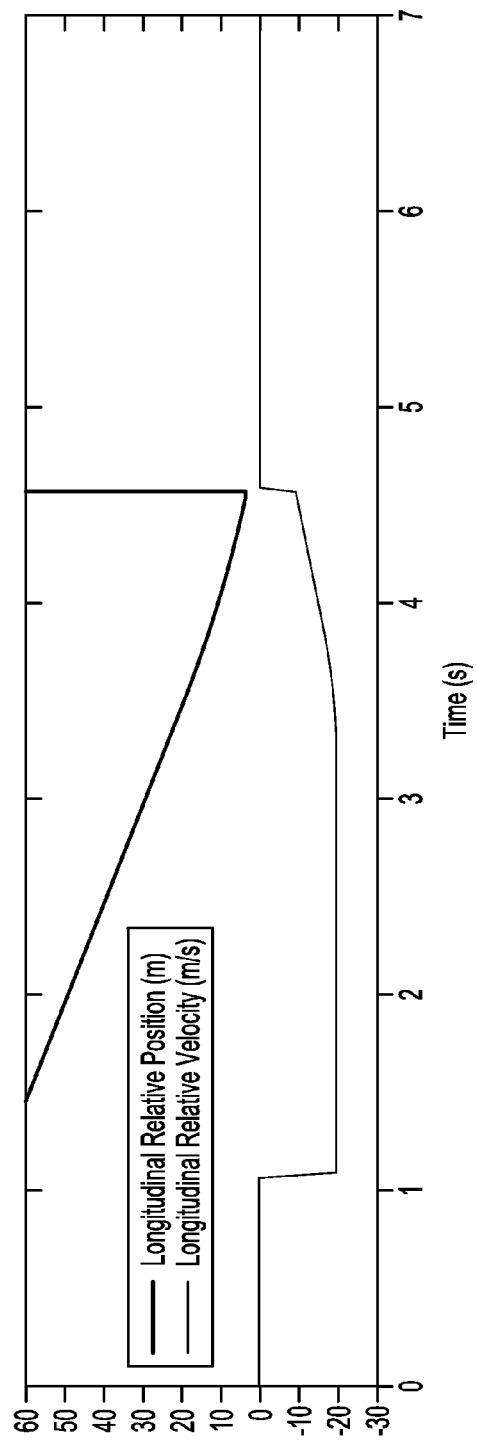

COLLISION MITIGATION SYSTEM AND METHOD FOR BRAKING A VEHICLE

BACKGROUND

An objective of Collision Mitigation by Braking (CMbB) is to reduce the number and severity of rear-end vehicle accidents by autonomously applying brakes of the host vehicle in a robust and reliable manner. Depending of the timing and magnitude of the brake apply, the results of the autonomous braking can range from accident mitigation (by reducing the impact speed and thus impact energy) to accident avoidance.

SUMMARY

A collision mitigation system for a vehicle may be configured to detect objects in front of the vehicle, to determine whether the vehicle can be steered into a path along side of the vehicle to avoid a collision with detected objects, and to issue a command to brake the vehicle if the vehicle cannot be steered into the path along side of the vehicle.

While example embodiments in accordance with the invention are illustrated and disclosed, such disclosure should not be construed to limit the invention. It is anticipated that various modifications and alternative designs may be made without departing from the scope of the invention.

BRIEF DESCRIPTION OF THE DRAWINGS

FIG. 8A is another example plot of in-path BTN, STN, threat, and no steerable path versus time.

FIG. 8B is another example plot of longitudinal relative position and velocity versus time.

DETAILED DESCRIPTION

Figure 1:
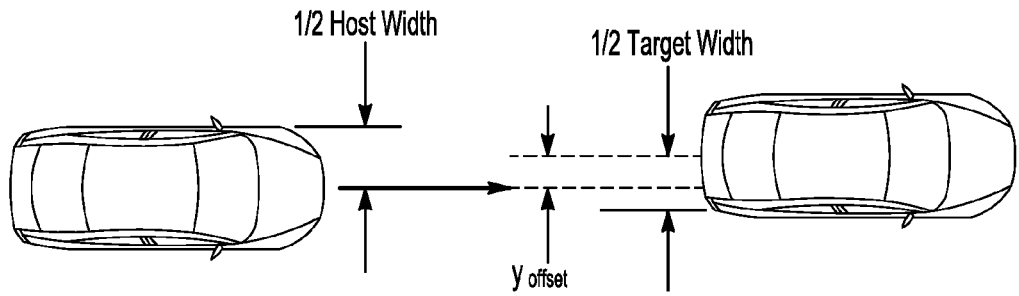
FIG. 1 illustrates an offset between two vehicles.

Algorithms entitled Multi Target Threat Assessor using Non-Steerable Path Assessment are described herein. These algorithms may take into account what is occurring in paths adjacent to the host vehicle as well as what is occurring in the path in front of the host vehicle. In certain embodiments, these algorithms may employ an autonomous braking request earlier than situations where only the path in front of the host vehicle is considered. This approach may allow for collision avoidance in some scenarios.

Initial implementations of Collision Mitigation by Braking (CMbB) utilized an in-Path Threat Assessor that only monitored the closest in-path vehicles to determine if they were sufficiently threatening to employ autonomous braking. To increase robustness, CMbB using an In-Path Threat Assessor may wait until it is no longer possible for the host vehicle to steer to avoid a rear-end collision. For higher relative speeds, the steer-around point occurs later than when it becomes impossible for the host vehicle to avoid the accident by braking. By the time CMbB intervenes with braking using the in-Path Threat Assessor, accident mitigation is the expected outcome.

To enable the possibility of avoidance at higher relative speeds, the Multi Target Threat Assessor using Non-Steerable Path Assessment algorithms include an assessment of whether or not the host vehicle is able to steer into adjacent paths. If, for example, the adjacent paths are blocked on both the left and right sides, autonomous braking may be introduced earlier.

The basis for certain of the In-Path Threat Assessors for CMbB is the Braking and the Steering Threat Numbers, BTN and STN respectively. The BTN is a ratio of the longitudinal deceleration needed by the host vehicle to avoid a collision compared to how much deceleration is possible by the host vehicle. Similarly, the STN is the ratio of the lateral acceleration needed to avoid a collision compared to how much lateral acceleration can be achieved by the host vehicle. The BTN and STN may be calculated using the following equations:

$$BTN = \begin{cases} 0 & \ddot{x}_{needed} \geq 0 \\ \dfrac{\ddot{x}_{needed}}{\ddot{x}_{max}} & \text{if } \ddot{x}_{max} < \ddot{x}_{needed} < 0 \\ 1 & \text{otherwise} \end{cases} \quad (1)$$

$$\ddot{x}_{needed} = \ddot{x}_{target} + \frac{|\dot{R}|\dot{R}}{2R} \text{ and } \ddot{x}_{max} < 0 \quad (2)$$

where, $\ddot{x}_{needed}$ (m/s$^2$): Needed longitudinal deceleration to avoid a collision $\ddot{x}_{max}$ (m/s$^2$): Maximum achievable deceleration of the host vehicle during ideal conditions $R$ (m): Range $\dot{R}$ (m/s): Range Rate $\ddot{R}$ (m/s$^2$): Relative Acceleration $$STN = \frac{2(y_{clearance} - y_{offset})}{t_{TTC}^2 \ddot{y}_{max}}$$

where, $t_{TTC}$: Minimum solution of $0.5\ddot{R}t_{TTC}^2 + \dot{R}t_{TTC} + R = 0$ $t_{TTC}$ (s): Estimated time to collision $\ddot{y}_{max}$ (m/s$^2$): Maximum average lateral acceleration that can be achieved by a vehicle under ideal conditions $y_{clearance}$ (m): Lateral distance that needs to be traveled in order to achieve lateral clearance. (For in-path vehicle targets, $y_{clearance}$ is typically equal to the sum of half the host vehicle width and half the target width.)

$y_{offset}$ (m): Lateral offset between the host and the target vehicle (as illustrated in FIG. 1)

A BTN equal to 1 means that if maximum braking were initiated, the host vehicle would just barely avoid a collision with the vehicle in front of it. Likewise, an STN of 1 means that if maximum steering where initiated, the host vehicle would just barely avoid a collision with the vehicle in front of it. Of course, there are other approaches to determining if a vehicle is capable of steering to avoid an object. For example, lateral slide-slip, front wheel slip, yaw rate, road coefficient of friction, the vehicle's handling characteristics and/or the driver's experience level or past behavior when encountering similar circumstances may be used.

Figure 2:
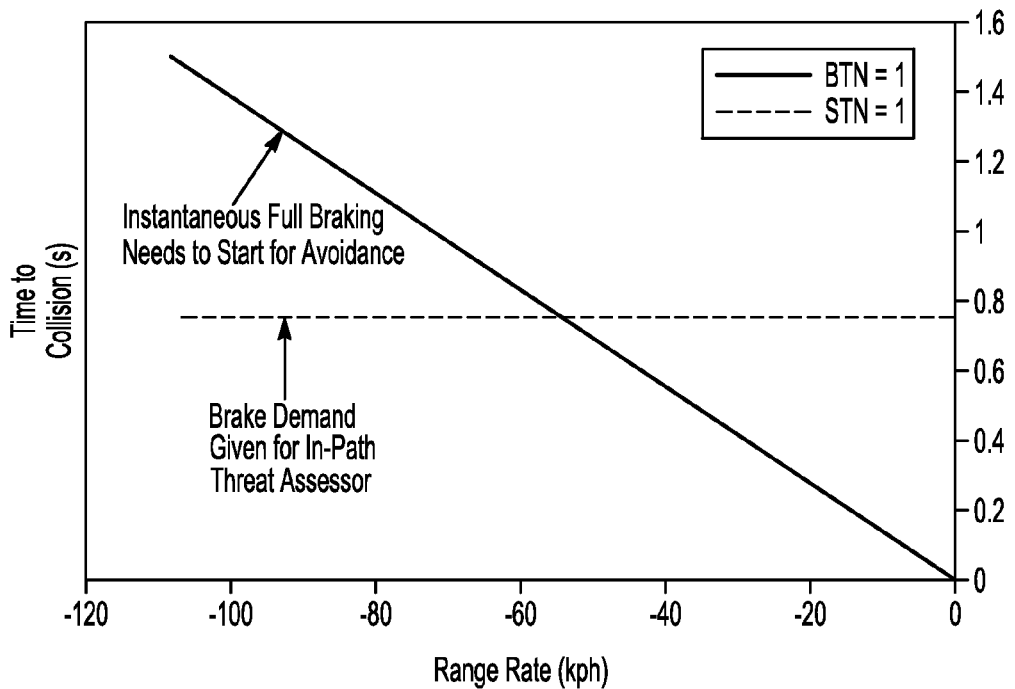
FIG. 2 is an example plot of time to collision versus range rate.

For the In-Path Threat Assessor, no knowledge of adjacent lane vehicles is taken into account. Because of this, CMbB utilizing the In-Path Threat Assessor does not send a brake request until the STN becomes 1. It is at this point that the In-Path Threat Assessor declares the accident unavoidable by means of steering around the in path target vehicle. This is done to reduce the likelihood of autonomous braking intervention in situations where the driver can still steer out of the way. A side effect of this is that there is no longer enough time to provide braking at levels sufficient to allow for collision avoidance except at lower range rates (see FIG. 2).

Regardless of the range rate, the STN in this example reaches 1 at approximately 750 msec to collision. The exact timing at which the STN becomes imminent is dependent on the final tuning of the algorithm and may vary based on the host and target widths, the maximum lateral acceleration of the host vehicle, the width of the host and target vehicles, and the lateral offset of the host vehicle to the target vehicle. The maximum lateral acceleration that a vehicle can achieve varies by vehicle model, but a value of 7 m/s$^2$ is typical. Using only the In-Path Threat Assessor, mitigation is the goal with a speed reduction target of 8 kph.

Figure 3A:
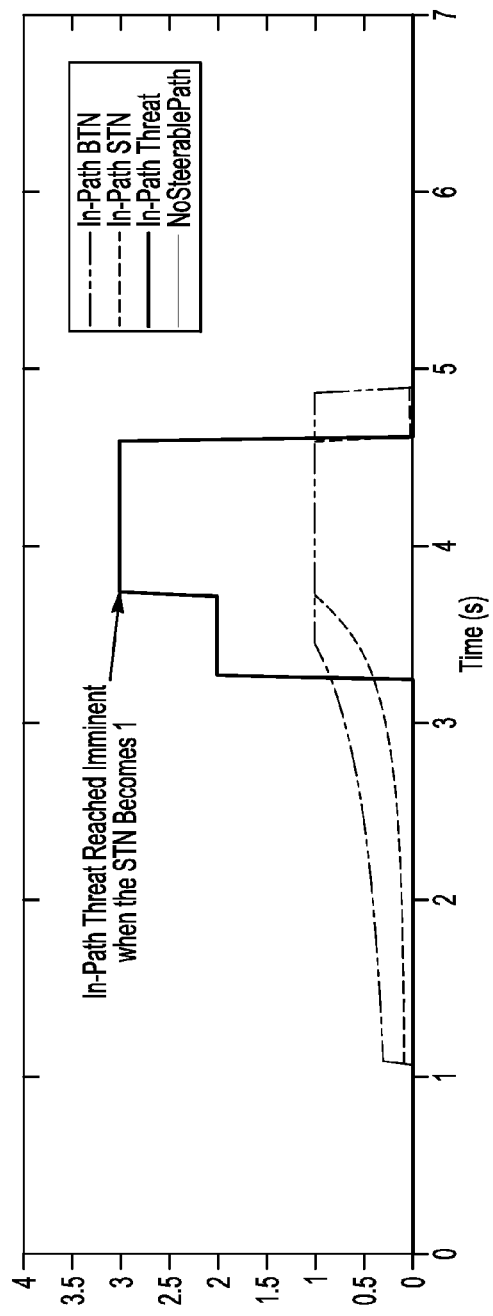
FIG. 3A is an example plot of in-path BTN, STN, threat, and no steerable path versus time.
Figure 3B:
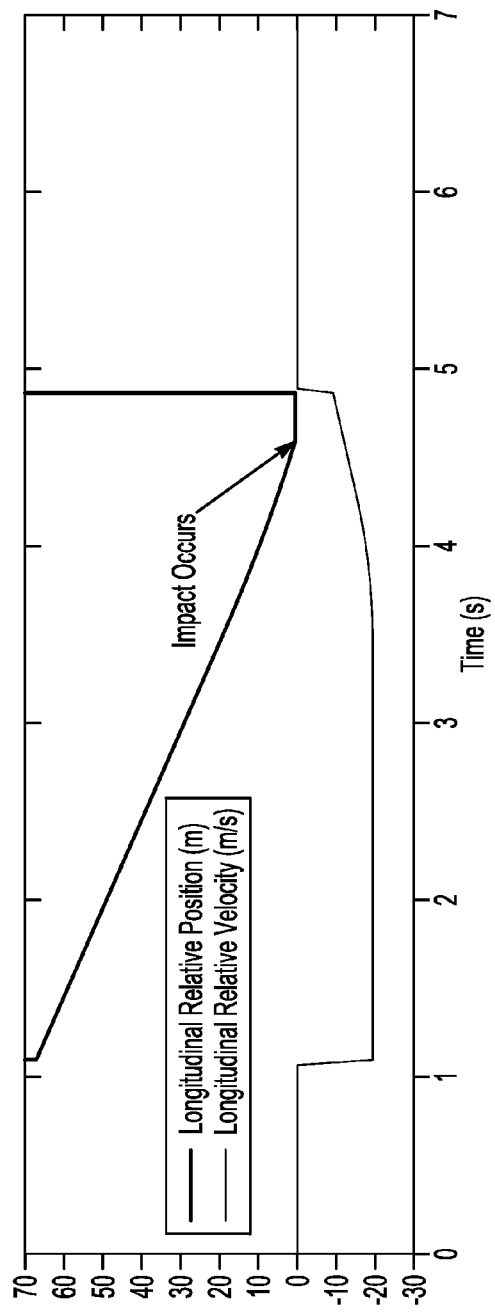
FIG. 3B is an example plot of longitudinal relative position and velocity versus time.

FIGS. 3A and 3B show the results of a test run with the host vehicle driving towards a stationary in-path target vehicle at 72 kph (20 m/s) with a steerable path available. The threat does not become imminent (In-Path Threat=3) until the STN reaches 1 at a time of approximately 3.8 seconds. The BTN actually reaches 1 approximately 300 ms earlier. At this point, there is no longer the possibility to avoid the accident by braking alone.

To provide the opportunity for CMbB to be able to achieve collision avoidance in some scenarios, additional intervention time can be potentially gained by introducing a threat assessor that also looks at what is occurring in the paths adjacent to the host vehicle in addition to what is occurring in the host's path. By considering the adjacent paths, it can be established if there is a viable path for the host vehicle to steer into to avoid an accident. Here, paths are referred to instead of lanes because it is not necessary to have lane information, or to even be traveling in a lane or on a road for this method to work. If there is not an open path to the left or the right, then it can be ascertained earlier that steering is likely not an option to avoid an accident. In this scenario, the In-Path Threat Assessor can declare the situation imminent at the time in which the driver would no longer be able to brake to avoid the collision. The In-Path Threat Assessor no longer has to wait until the driver is unable steer around the in-path vehicle before declaring the threat imminent. For relative speeds above approximately 25 kph, utilizing the NSP Threat Assessor (the Multi Target Threat Assessor using Non-Steerable Path Assessment may be referred to henceforth as the NSP Threat Assessor) in conjunction with the In-Path Threat Assessor, an opportunity exists for CMbB to achieve collision avoidance in some scenarios that would not have existed using the In-Path Threat Assessor alone.

Figure 4:
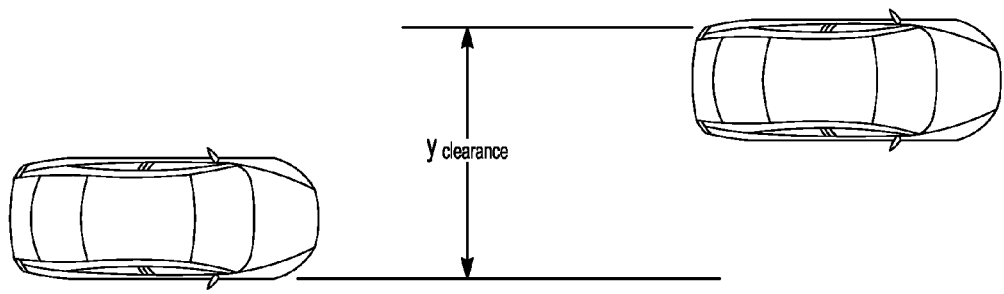
FIG. 4 illustrates a clearance between two vehicles.

The NSP Threat Assessor, in some embodiments, provides an assessment of non-steerable path by applying the BTN and a one sided STN calculation on the targets that are closest longitudinally in the adjacent paths if both exist. With the In-Path Threat Assessor, the STN calculation that is done allows for the driver to steer around to the right and left. For a vehicle in an adjacent lane, the primary interest is how much steering would be needed to steer completely around the vehicle to the side that vehicle is on, so a one sided STN calculation is used. The expression for adjacent lane STN below is derived by removing the lateral offset value from (3):

$$\text{Adjacent\_Lane\_STN} = \frac{2(y_{clearance})}{t_{TTC}^2 \ddot{y}_{max}} \quad (4)$$

where, $y_{clearance}$ (m): Lateral distance to clear the adjacent lane vehicle to the side that the vehicle is on (see FIG. 4)

The NSP Threat Assessor path may also take as inputs, if available, vehicle blind spot, guardrails, lane markings, walls and/or road information, etc. A path may be declared as a "non steerable path" in the following example ways: (i) a guardrail, wall, particular lane marking is detected adjacent to the host's path; (ii) a navigation system determines the vehicle is traveling on a two-lane road, i.e., one lane in each direction such that the adjacent paths comprising the opposing traffic lane and the shoulder are declared non steerable; (iii) a blind spot detection system detects an object in the vehicle's blind spot; (iv) the BTN and STN values of the vehicles in the adjacent paths exceed a set threshold—if steering into an adjacent lane is sufficiently threatening, the driver is unlikely to consider the adjacent lane an avoidance maneuver path.

The presence of a guardrail within proximity of the path is a potential cause to declare the path non steerable. A guardrail may be detectable as a set of stationary objects using known curve fitting techniques. Combined with the offset distance from the estimated vehicle path, an assessment of an adjacent path can be made with regard to the likelihood of it being steerable. Other objects such as a row of trees or a continuous embankment can likewise be detected in the same manner as the guardrail. Additionally, lane markings may also be used (in a manner similar to guardrails) to determine whether an adjacent path is steerable.

A navigation system may contain road information that can be used to declare a path non steerable. The number of lanes for a particular road, for example, may be provided by the navigation system. Whether these lanes are to be driven in the same or opposite directions may also be provided. A NSP can be declared for a host vehicle if an adjacent lane is an oncoming lane, whether or not there are other vehicles in the vicinity. An alternative would be to identify no-passing zones and declare the oncoming lane an NSP only in a no-passing zone. If an oncoming lane is considered viable if no oncoming vehicles are present, then additional information may be needed from either the forward sensing system (e.g., radar and/or camera) or from vehicle to vehicle communication. As another example, the right side shoulder can be considered off-road in the majority of cases and declared a NSP.

Side sensing systems that provide a driver notification of a vehicle rearward in an adjacent lane, often referred to as the blind spot, can provide information to declare a path non steerable. The sensor, typically radar, is located toward the rear side of the vehicle, and projects rearward and outward into the adjacent lane. If a vehicle is present in the field of view, NSP threat assessment can be made based on the adjacent lane vehicle speed. For example, if the adjacent lane vehicle speed is greater than the host speed, that path can be declared non steerable. Or if a vehicle is next to the host, even if at the same speed as the host, that path can be declared non steerable. It is noted that the field of view does not typically overlap the forward sensing field of view in the region next to the host front wheel. The resulting gap depends on the forward sensing field of view that typically has its origin at the front of the vehicle.

By employing adjacent path threat calculations in certain situations, it can be determined that there is likely not a viable path for the host vehicle to steer into. This is determined by calculating the BTN and the adjacent path STN for vehicles to both the left and right of the host vehicle. Once the value of these gets above a predetermined threshold (0.2 may be used for example), the adjacent paths are declared non steerable. If both the right and left adjacent paths are non steerable, then it is determined that there is no-steerable path.

Figure 5:
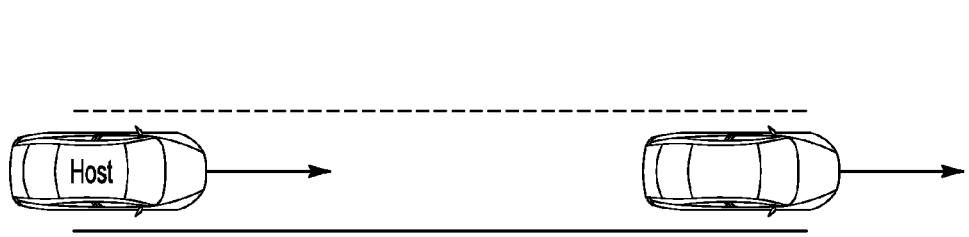
FIG. 5 illustrates a host vehicle having a steerable path available.
Figure 6:
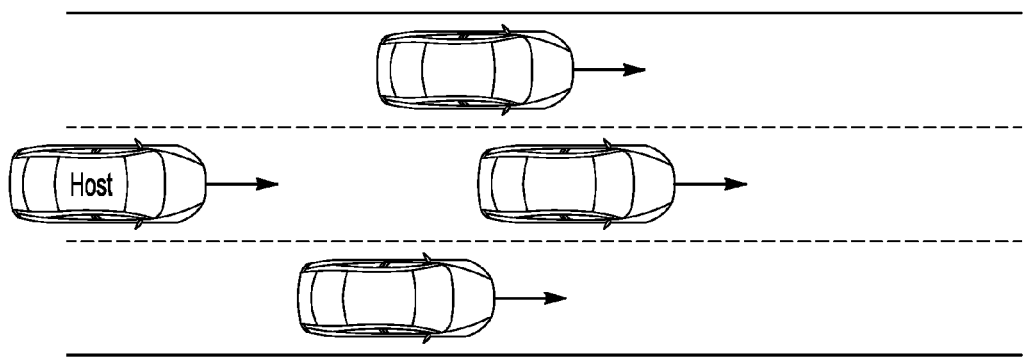
FIG. 6 illustrates a host vehicle having no steerable path available.

If a steerable path is available (see FIG. 5), the determination of threat may default to the standard In-Path Threat Assessor. If there is no steerable path available (see FIG. 6), the in-path STN will be set immediately to 1, since steering is no longer a viable option. In this case, increased mitigation or accident avoidance through braking becomes a goal.

The moment the BTN becomes 1 indicates the time at which an instantaneous application of the maximum available braking could just barely avoid an accident (0.8 g's is a typical value). In practice, however, instantaneous braking may not be possible because of braking delays. Braking delays can be characterized by two main components: the dead time and the rise time. The dead time refers to the time from when the brake pressure is requested to when the brake pressure actually starts to rise. The brake rise time is the time that it takes for the brake pressure to reach the requested value from the start of pressure build-up. Due to the braking delays, the request for maximum braking may need to be triggered prior to the BTN actually becoming 1 if avoidance is to be achieved.

A modified BTN that takes into account brake delays may be introduced to trigger autonomous braking. This modified BTN calculation can also be used for the In-Path Threat Assessor when there is a steerable path available. Since the In-Path Threat Assessor, however, waits until the STN is 1 to declare a threat imminent, no braking benefit is actually realized.

Introduction of brake delays into the BTN calculation can be done in at least two ways. One such method is achieved by modifying the BTN threshold that is needed to declare the threat imminent such that brake delays are taken into account. Another suitable method leaves the BTN imminent threshold constant and instead modifies the inputs to the BTN calculation. Essentially, the values are predicted ahead in time by the amount of brake delay to induce BTN to imminent at the time at which braking must begin to achieve avoidance. Both methods achieve similar results.

The modified BTN imminent threshold approach lowers the value of the BTN imminent threshold to allow for brake delays in order to provide an opportunity for avoidance. The modified BTN imminent threshold is implemented by first determining the delays of the brake system. For preliminary purposes, this is set as a constant, but could also be set to vary across different speeds. The BTN threshold to declare imminent is then determined using this brake system delay. This threshold will now depend on the relative speed of the vehicles, and will no longer be a set value as was the case for the standard in-path threat assessment.

To derive the calculation for determining the BTN imminent threshold that takes into account the brake delays, the following assumptions were made:

$$\ddot{x}_{target}=0, \ddot{R}=0 \text{ and } \dot{R}<0$$

where,
$\ddot{x}_{target}$: The target longitudinal acceleration
$\ddot{R}$: The relative acceleration between host and target vehicles
$\dot{R}$: The range rate The Time to Collision (TTC) is given by:

$$TTC = \frac{-R}{\dot{R}} \quad (6)$$

Substituting (6) into the calculation of BTN from (1) and (2), and solving for time to collision yields the following equation:

$$TTC = \frac{\dot{R}}{2BTN\ddot{x}_{max}} \quad (7)$$

The time that will elapse from when the BTN value is at a certain threshold to when it reaches 1 can be calculated by subtracting the TTC when the BTN is 1 in (7) from the TTC at an arbitrary BTN threshold in (7). For our purposes, this period corresponds to the time that will be allotted to compensate for the brake delays:

$$t_{sysdelay} = \frac{\dot{R}}{2BTN\ddot{x}_{max}} - \frac{\dot{R}}{2\ddot{x}_{max}} \quad (8)$$

where,
$t_{sysdelay}$=Estimated brake system delay time $\ddot{x}_{max}$=Maximum deceleration Solving (8) for BTN gives the threshold that the BTN imminent should be set to as a function of the system delay if an accident is to be avoided:

$$BTN_{imminent\_threshold} = \frac{1}{1 + \frac{2t_{sysdelay}\ddot{x}_{max}}{\dot{R}}} \quad (9)$$

Figure 7:
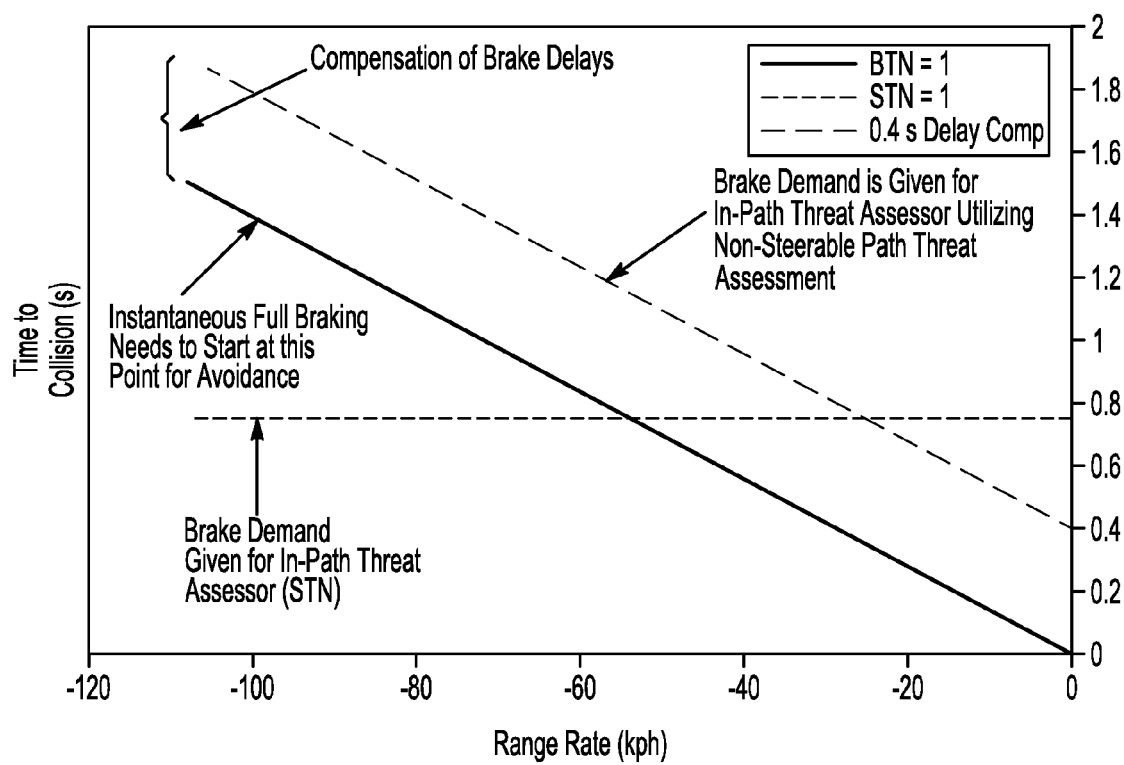
FIG. 7 is another example plot of time to collision versus range rate.

In FIG. 7, the solid line representing the BTN reaching 1 corresponds to the timing at which the brakes must reach their full expected magnitude in order for an accident to be avoided. The long-dashed line represents the time at which a threat is declared imminent by the In-Path Threat Assessor utilizing the NSP Threat assessor. The timing of this line assumes $t_{sysdelay}$ of 0.4 seconds and corresponds to the extra time needed when authorizing autonomous braking to take into account brake system delays. If the brake demand is given at the timing corresponding to this line for a given range rate, the full expected braking will be achieved by the time the BTN would have reached 1, and avoidance becomes possible. For comparison purposes, the timing at which the In-Path Threat Assessor would have declared imminent (STN equal to 1) is also shown.

FIGS. 8A and 8B show the threat assessment results for a test in which the host vehicle drives towards a stationary in-path vehicle at 72 kph (20 m/s) with no steerable paths available by the time the threat is declared. In this test, stationary vehicles were parked adjacent to the in-path vehicle blocking the escape routes for the host vehicle. This is the same test run as was used for FIGS. 3A and 3B, but this time the NSP Threat Assessor was also used. This was done so that valid comparisons could be made between the timing of intervention of the threat assessors. A brake delay assumption of 0.45 seconds was used which resulted in a BTN Imminent Threshold of 0.68 to achieve avoidance.

At the point the adjacent paths are declared non steerable paths, the in-path threat is still not threatening enough to be declared imminent (Threat=3). If there was a steerable path available, this would have waited until the STN=1 (test time=3.8 s) as was the case in FIGS. 3A and 3B. Since there is no steerable path available in this instance, the threat goes to imminent when the BTN equals the BTN imminent threshold (test time=3 s) approximately 0.45 seconds before the BTN would have gone to 1 without autonomous braking. This gives the system enough time to account for brake delays and achieve avoidance. This is also approximately 0.8 seconds earlier than the In-Path Threat Assessor (based on STN alone) would have requested the brake intervention. In these plots, the BTN goes to 1 approximately 0.6 seconds after the threat is declared imminent because after the imminent is declared, the brakes begin to ramp up, slowing the increase of the BTN value to 1.

When making a determination to apply autonomous braking, robustness to unnecessary brake actuation events may be a priority. In certain circumstances, a path may be declared non steerable while a passable gap for the driver to steer into may exist in a potential imminent collision scenario. Earlier braking would not be warranted because the driver still has the ability to steer to avoid the accident. The conditions needed to encounter these circumstances may involve a particular stack up of host speed, in path target speed and position, and adjacent target speeds and position.

Figure 9:
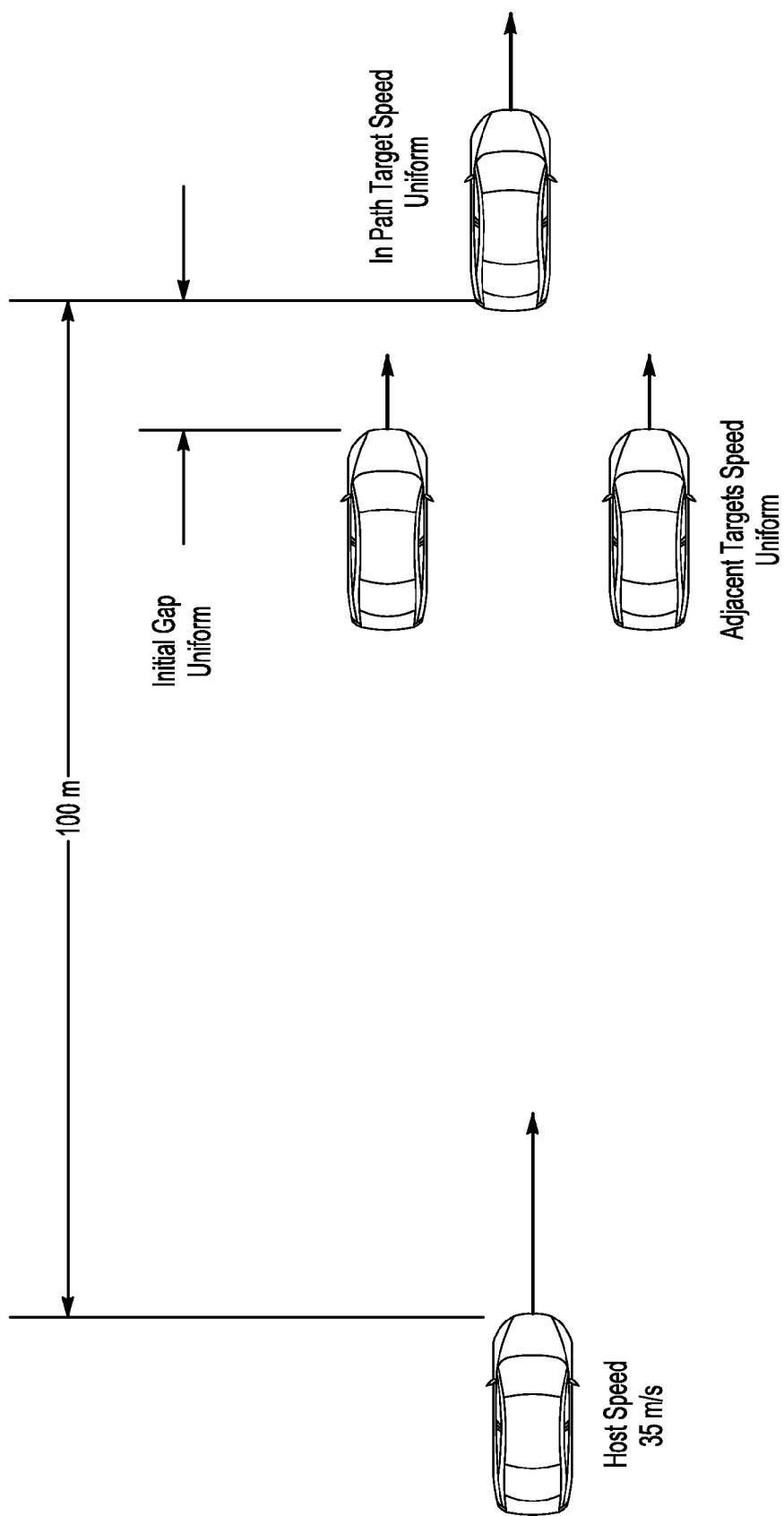
FIG. 9 illustrates potential gap situations between vehicles.

These circumstances were tested by using the NSP Threat Assessment algorithm in conjunction with a vehicle environment simulator. Using the simulator, a 1000 run Monte Carlo experiment was performed varying the host speed, in path target speed, starting position, and adjacent target speeds and starting positions. The initial conditions and a layout of the simulation are illustrated in FIG. 9.

These conditions were chosen to maximize the likelihood that the passable gap circumstances discussed above would be exposed. To determine if a gap would have existed, the timing at which the adjacent target was passed was compared to the time at which the in-path target became imminent in the simulation. A steerable gap was considered to have existed if the longitudinal gap between the adjacent lane vehicle and the in-path vehicle was greater than the host vehicle's length at any time before the In-Path Threat Assessor indicates that the host would no longer have been able to steer around the in-path vehicle (i.e. STN=1).

The initial results of the study showed that out of a total of 1000 runs, 105 of them exhibited the above described circumstances. For some of the runs, the gap was very minimal and it would have been extremely difficult for the driver of the host vehicle to steer into. For other runs, even a moderate driver would have been able to steer into the gap and yet the path was declared a non steerable path.

In order to reduce the occurrence of these circumstances, the algorithm may be modified to include a prediction of the potential for a gap to exist before the threat would have been declared imminent otherwise. This is done by comparing the time until the in-path threat would become imminent to the time it will take to pass the adjacent vehicles. If the time until the in-path target is imminent is longer than the time to pass the adjacent target, then the threat will not be allowed to go high early to achieve avoidance. Instead, it will be declared imminent according to the In-path Threat Assessor and mitigation will be the goal. With the modified algorithm, the Monte Carlo simulation was rerun, and this time 999 out of 1000 runs passed. In the one remaining run where the threat becomes imminent, it did so for only one sample time which is likely not long enough for the deceleration to be noticed by the driver.

Figure 10:
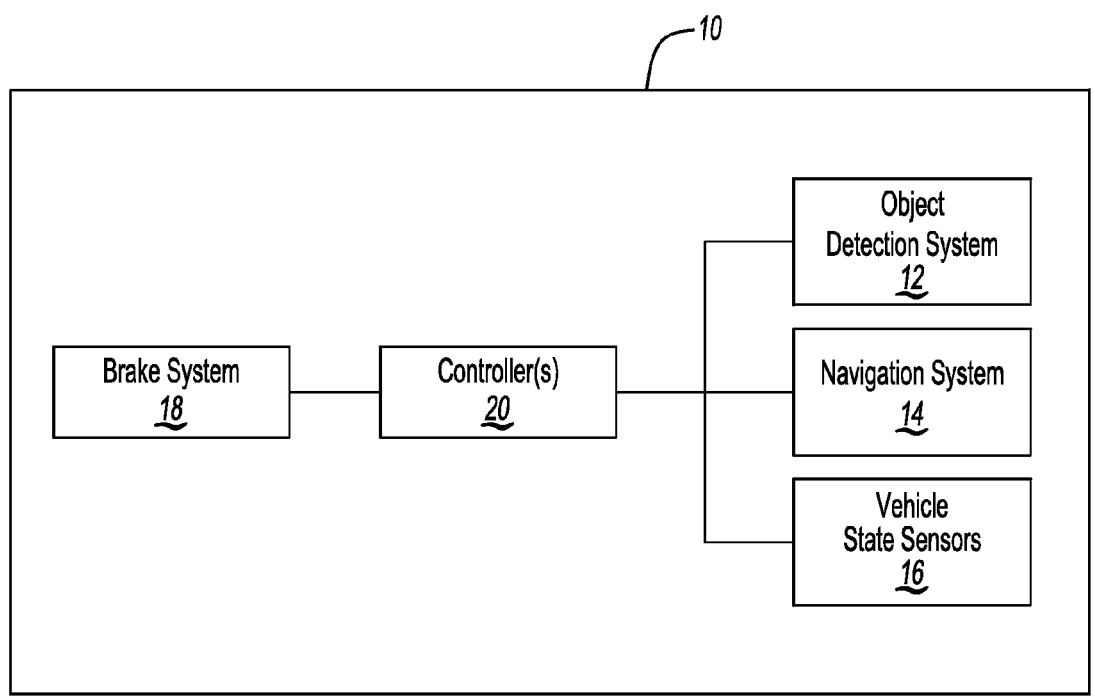
FIG. 10 is a block diagram of an embodiment of an automotive vehicle.

FIG. 10 illustrates an example vehicle 10 equipped to perform the techniques described above. The vehicle 10 includes an object detection system 12, navigation system 14, vehicle state sensors 16, brake system 18 and one or more controllers 20. The one or more controllers 20 are in communication with the object detection system 12, navigation system 14 and vehicle state sensors 16. The brake system is under the command/control of the one or more controllers 20. Other configurations are, of course, also possible.

The object detection system 12 may be any suitable/known object detection system including radar, lidar, vision, vehicle-to-vehicle communication, etc. capable of detecting objects (e.g., vehicles, lane markings, guardrails, etc.) in front of and/or adjacent to the vehicle 10. The navigation system 14 may be any suitable/known navigation system capable of determining road information in a vicinity of the vehicle 10. The vehicle state sensors 16 may include suitable/known speed sensors, acceleration sensors, yaw/pitch/roll rate sensors, steering angle/rate sensors, brake pedal position sensors, throttle position sensors, etc.

The systems 12, 14 and sensors 16 collect the information, in a known fashion, such as $y_{clearance}$, R, etc. discussed above. The one or more controllers 20 then use this information to evaluate (1) through (9) and issue brake commands to the brake system 18 as discussed above.

As apparent to those of ordinary skill, the algorithms disclosed herein may be deliverable to a processing device in many forms including, but not limited to, (i) information permanently stored on non-writable storage media such as ROM devices and (ii) information alterably stored on writeable storage media such as floppy disks, magnetic tapes, CDs, RAM devices, and other magnetic and optical media. The algorithms may also be implemented in a software executable object. Alternatively, the algorithms may be embodied in whole or in part using suitable hardware components, such as Application Specific Integrated Circuits (ASICs), state machines, controllers or other hardware components or devices, or a combination of hardware, software and firmware components.

While embodiments of the invention have been illustrated and described, it is not intended that these embodiments illustrate and describe all possible forms of the invention. Rather, the words used in the specification are words of description rather than limitation, and various changes may be made without departing from the spirit and scope of the invention.

What is claimed:

1. A collision mitigation system for a vehicle comprising:
 a brake system;
 a forward sensing system configured to detect objects in front of, and adjacent to, the vehicle; and
 at least one controller in communication with the forward sensing system and configured to
   periodically determine (a) whether based on a vehicle driver's experience level or past behavior when encountering similar circumstances the vehicle would likely be, and can be, steered by the vehicle driver into a path along side of the vehicle to avoid a collision with detected objects in front of the vehicle and (b) whether a needed vehicle longitudinal deceleration to avoid a collision with the detected objects is less than a maximum vehicle longitudinal deceleration, and issue a command to brake the vehicle based on delays of the brake system and after it is determined that (i) the vehicle would unlikely be steered by the vehicle driver into the path along side the vehicle and the ratio of the needed vehicle longitudinal deceleration compared to the maximum vehicle longitudinal deceleration reaches a set threshold value, or (ii) the vehicle cannot be steered into the path along side of the vehicle and the needed vehicle longitudinal deceleration becomes approximately equal to the maximum vehicle longitudinal deceleration.

2. The system of claim 1 further comprising a navigation system, wherein the at least one controller is further configured to determine whether the path along side of the vehicle is a lane based on information received from the navigation system.

3. The system of claim 2 wherein the at least one controller is further configured to determine whether the path along side of the vehicle is an on-coming lane based on information received from the navigation system.

4. The system of claim 1 wherein the at least one controller is further configured to determine whether there are any vehicles in the path along side of the vehicle.

5. The system of claim 1 wherein the at least one controller is further configured to determine whether there are any objects in the path along side of the vehicle.

6. A method for braking a vehicle comprising:

detecting an object in front of the vehicle;

determining whether based on a vehicle driver's experience level or past behavior when encountering similar circumstances the vehicle would unlikely be steered by the vehicle driver into an adjacent lane;

determining whether the vehicle cannot be steered into an adjacent lane; and in response to a determination that the vehicle cannot be steered or would unlikely be steered by the vehicle driver into an adjacent lane, issuing a command to a brake system to brake the vehicle based on delays of the brake system when the needed vehicle longitudinal deceleration to avoid a collision with the object (i) as compared to the maximum vehicle longitudinal deceleration reaches a set threshold if it is determined that the vehicle would unlikely be steered by the vehicle driver into the path along side of the vehicle or, (ii) become approximately equal to a maximum vehicle longitudinal deceleration if it is determined that the vehicle cannot be steered into the path along side of the vehicle.

* * * * *